US011806201B2

(12) United States Patent
Kim

(10) Patent No.: US 11,806,201 B2
(45) Date of Patent: Nov. 7, 2023

(54) REAL-TIME MONITORING SYSTEM FOR ARTIFICIAL TOOTH PROCESSING MACHINE

(71) Applicant: ZEUS TECH CO., LTD., Gangwon-do (KR)

(72) Inventor: Hong Youn Kim, Gangwon-do (KR)

(73) Assignee: ZEUS TECH CO., LTD., Gangwon-do (KR)

( * ) Notice: Subject to any disclaimer, the term of this patent is extended or adjusted under 35 U.S.C. 154(b) by 0 days.

(21) Appl. No.: 17/592,534

(22) Filed: Feb. 4, 2022

(65) Prior Publication Data

US 2023/0210643 A1    Jul. 6, 2023

(30) Foreign Application Priority Data

Jan. 6, 2022    (KR) ........................ 10-2022-0002371

(51) Int. Cl.
*A61C 13/00*    (2006.01)
*A61C 13/08*    (2006.01)
*A61C 19/04*    (2006.01)

(52) U.S. Cl.
CPC .......... *A61C 13/0006* (2013.01); *A61C 13/08* (2013.01); *A61C 19/04* (2013.01)

(58) Field of Classification Search
None
See application file for complete search history.

(56) References Cited

U.S. PATENT DOCUMENTS

| | | | | |
|---|---|---|---|---|
| 4,766,704 A | * | 8/1988 | Brandestini | A61C 5/77 D34/21 |
| 5,452,219 A | * | 9/1995 | Dehoff | G05B 19/4099 700/182 |
| 6,905,293 B1 | * | 6/2005 | Filser | A61C 13/0003 409/98 |
| 10,743,970 B2 | * | 8/2020 | Steger | B23Q 39/028 |
| 2009/0129882 A1 | * | 5/2009 | Tchouprakov | B23Q 17/0971 433/25 |
| 2019/0209266 A1 | * | 7/2019 | Moon | B23Q 11/10 |
| 2021/0346099 A1 | * | 11/2021 | Chen | A61B 34/10 |

(Continued)

FOREIGN PATENT DOCUMENTS

| | | | | |
|---|---|---|---|---|
| AU | 3274797 A | * | 1/1998 | |
| CN | 109542045 A | * | 3/2019 | ........... G05B 19/406 |

(Continued)

*Primary Examiner* — Jacob J Cigna
(74) *Attorney, Agent, or Firm* — Revolution IP, PLLC

(57) ABSTRACT

A real-time monitoring system for an artificial tooth processing machine includes a work bed portion on which a base tooth material selected from a titanium material and a zirconia material is fixedly installed and in which a wet die configured to process a titanium material and a dry die configured to process a zirconia material are disposed to be comparted from each other, a processing tool portion having one end on which a driving spindle to which a processing tool is coupled is provided to process the base tooth material while approaching or moving away from the base tooth material, and a spindle monitoring portion provided on the driving spindle, disposed in the work bed portion, and configured to monitor the driving spindle to recognize an abrasion degree, a damage state, alignment, or the like of the processing tool in real time.

6 Claims, 8 Drawing Sheets

(56) References Cited

U.S. PATENT DOCUMENTS

| | | | |
|---|---|---|---|
| 2022/0226083 A1* | 7/2022 | Stark | A61C 13/0004 |
| 2022/0378560 A1* | 12/2022 | Schneider | A61C 13/083 |

FOREIGN PATENT DOCUMENTS

| | | | | |
|---|---|---|---|---|
| KR | 20010026892 A | * | 4/2001 | |
| KR | 100982778 B1 | * | 9/2010 | |
| KR | 101171600 B1 | * | 8/2012 | |
| KR | 101385374 B1 | * | 4/2014 | |
| KR | 20180060518 A | * | 6/2018 | |
| KR | 101931776 B1 | * | 12/2018 | |
| KR | 20220064630 A | * | 5/2022 | |
| KR | 20220081510 A | * | 6/2022 | |
| WO | WO-9749524 A1 | * | 12/1997 | A61C 13/0004 |
| WO | WO-2007110655 A2 | * | 10/2007 | A61C 13/0022 |
| WO | WO-2017222099 A1 | * | 12/2017 | A61C 13/00 |

* cited by examiner

REAL-TIME MONITORING SYSTEM FOR ARTIFICIAL TOOTH PROCESSING MACHINE

CROSS-REFERENCE TO RELATED APPLICATION

This application claims the benefit of Korean Patent Application No. 10-2022-0002371, filed on Jan. 6, 2022, in the Korean Intellectual Property Office, the disclosure of which is incorporated herein in its entirety by reference.

BACKGROUND

1. Field of the Invention

The present invention relates to a real-time monitoring system for an artificial tooth processing machine, and more particularly, to a real-time monitoring system for an artificial tooth processing machine capable of quickly and easily recognizing an abrasion degree, a damage state, alignment, or the like of a processing tool to predictively diagnose a replacement time, rebalancing, or the like.

2. Discussion of Related Art

Among medical apparatuses, a dental medical apparatus is a medical apparatus used for dental treatment that is one field of medicine in which a disease, an abnormal state, or the like in a maxillofacial region including teeth, peripheral tissue thereof, and an oral cavity is prevented, diagnosed, and treated. The dental material field occupies so great a proportion in the medical equipment field that it is designated as a separate field.

Also, in dental computer-aided design/computer aided manufacturing (CAD/CAM), installations necessary for a dental treatment process, for example, a prosthesis, a dental restoration material, an orthodontic appliance, a stent, and the like, may be three-dimensionally scanned using a computer and a dental prosthesis may be directly designed on the computer (CAD) and precisely cut using a processing machine (CAM) to be manufactured.

As a dental processing machine, and particularly, as an artificial tooth processing machine, a variety of processing apparatuses such as a turning, a machining center, a computer numerical control (CNC) lathe, and the like have been developed. Although mechanical properties of an artificial tooth such as the rigidity and the like are the most important parts of the corresponding artificial tooth processing machine, it is also necessary to secure processing precision for reducing discomfort by minimizing processing errors.

However, in the case of most conventional processing machines, since the degree of abrasion, a damaged state, or alignment of a processing tool is recognized with the naked eye and the processing tool is replaced or a balancing operation is performed depending on the level of skill of a worker, maintenance and repair costs and the number of operations necessarily increase and tooth processing productivity is negatively influenced.

Particularly, since it is not possible to recognize a state of a tool in real time during a dry/wet cutting process, a coarse value and the density of artificial tissue of an artificial tooth are not processed to desired levels due to a decrease in revolutions per minute (RPM) of a processing tool and thus the rigidity or life of the artificial tooth is significantly degraded.

SUMMARY OF THE INVENTION

The present invention is directed to providing a real-time monitoring system for an artificial tooth processing machine in which it is possible to quickly and easily recognize an abrasion degree, a damage state, whether aligned, or the like of a processing tool, and therefore a predictive diagnosis of a replacement time, rebalancing, or the like is possible so that maintenance and repair costs and the number of operations can be reduced and to productivity of processing an artificial tooth can be improved. Also, since it is possible to recognize a state of a tool in real time according to a dry or wet environment, a coarse value of an artificial tooth and the density of artificial tissue are processed to desired levels to significantly increase the rigidity or life of the artificial tooth.

According to an aspect of the present invention, there is a real-time monitoring system for an artificial tooth processing machine. The real-time monitoring system includes a work bed portion on which a base tooth material selected from a titanium material and a zirconia material is fixedly installed and in which a wet die configured to process a titanium material and a dry die configured to process a zirconia material are disposed to be comparted from each other, a processing tool portion having one end on which a driving spindle to which a processing tool is coupled is provided to process the base tooth material while approaching or moving away from the base tooth material, and a spindle monitoring portion provided on the driving spindle, disposed in the work bed portion, and configured to monitor the driving spindle to recognize an abrasion degree, a damage state, alignment, or the like of the processing tool in real time.

The spindle monitoring portion may be a predictive diagnosis sensor portion attached to the driving spindle.

The predictive diagnosis sensor portion may include a velocity sensor configured to measure a velocity and acceleration, a pressure sensor configured to measure a pressure, a temperature/humidity sensor configured to sense a temperature/humidity of the work bed portion, a tilt angle sensor configured to measure a tilt, and a frequency sensor configured to sense revolutions per minute (RPM) and a vibrational degree of the driving spindle from a measured frequency measured by the processing tool portion.

The predictive diagnosis sensor portion may be packaged in a single body, and long coupling holes may be formed in both ends of the single body.

The predictive diagnosis sensor portion may further include an impact sensor configured to sense an impact transferred from the driving spindle and a noise sensor configured to sense noise from a nature frequency.

A parameter value of the measured frequency may be any one of a root-mean-square (RMS) value, a peak value, and fast Fourier transform (FFT) value.

The frequency sensor may output a warning notification when the parameter value of the sensed measured frequency exceeds a preset first threshold.

The frequency sensor may output an operation stop signal to the processing tool portion when the parameter value of the sensed measured frequency exceeds a preset second threshold.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a configuration diagram of a real-time monitoring system for an artificial tooth processing machine according to one embodiment of the present invention.

DETAILED DESCRIPTION OF EXEMPLARY EMBODIMENTS

Hereinafter, one embodiment of a real-time monitoring system for an artificial tooth processing machine according to the present invention will be described in detail with reference to the attached drawings.

Figure 1:
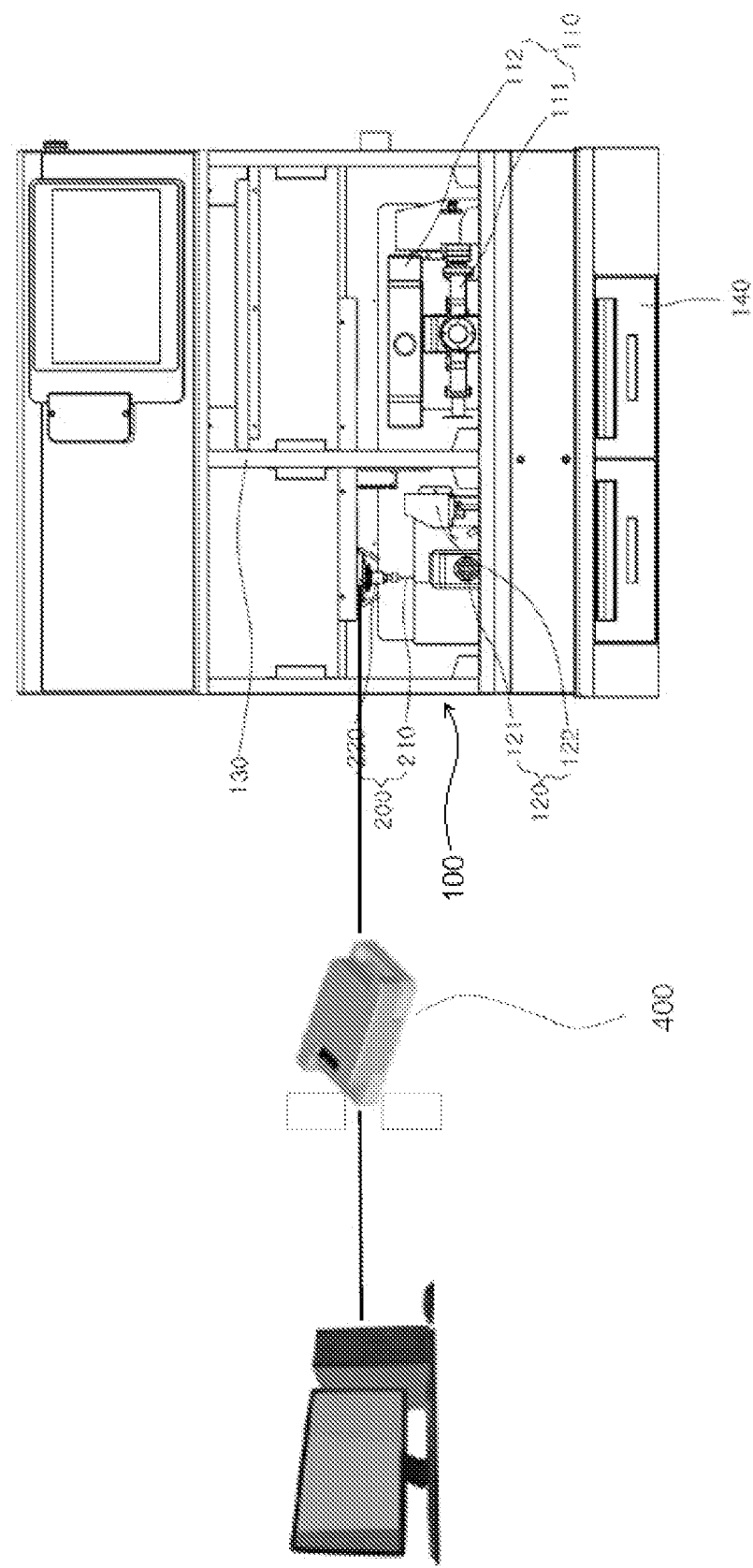
Figure 2:
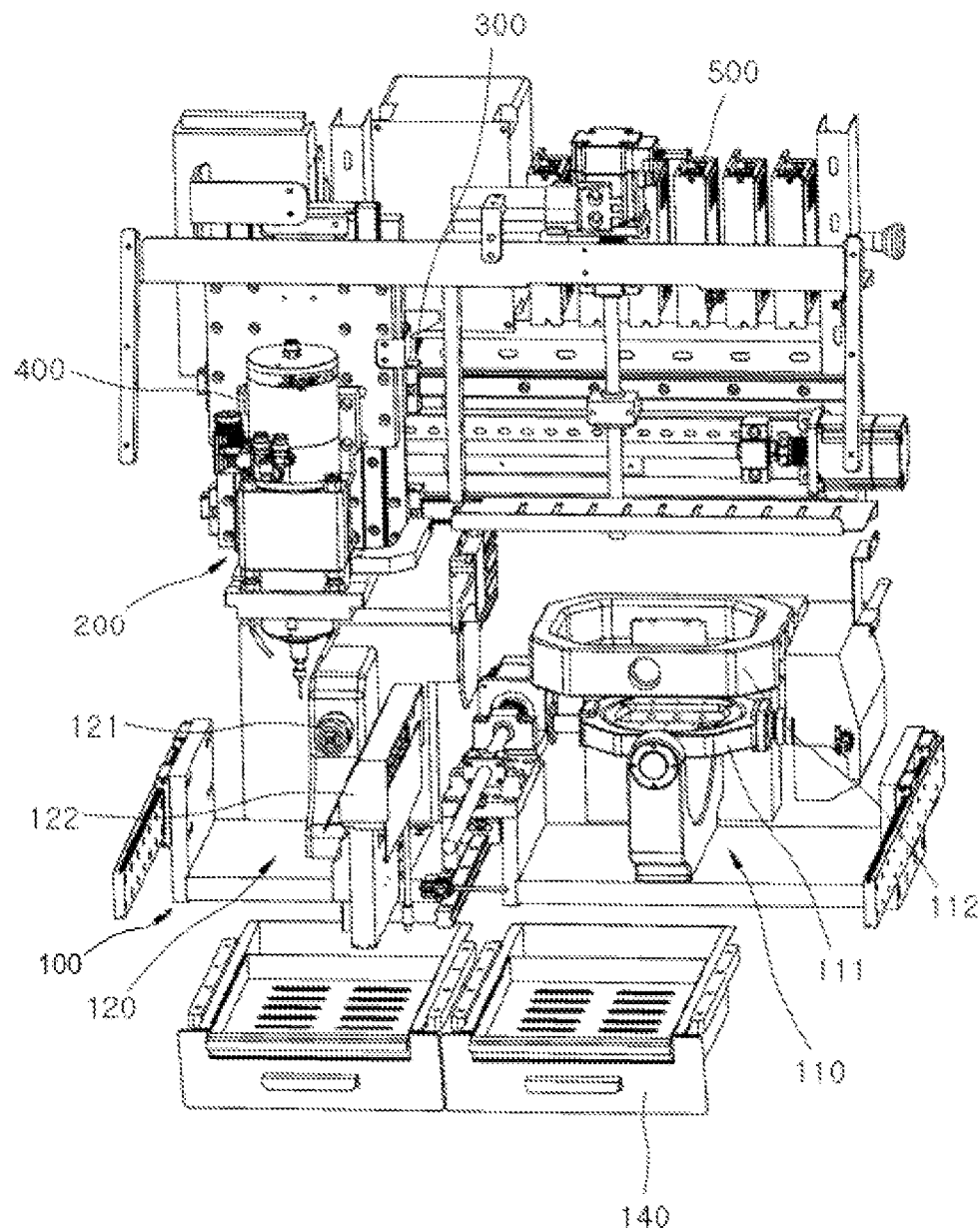
FIG. 2 is a perspective view illustrating a state in which a casing of the artificial tooth processing machine is eliminated from the real-time monitoring system for the artificial tooth processing machine according to one embodiment of the present invention.
Figure 3:
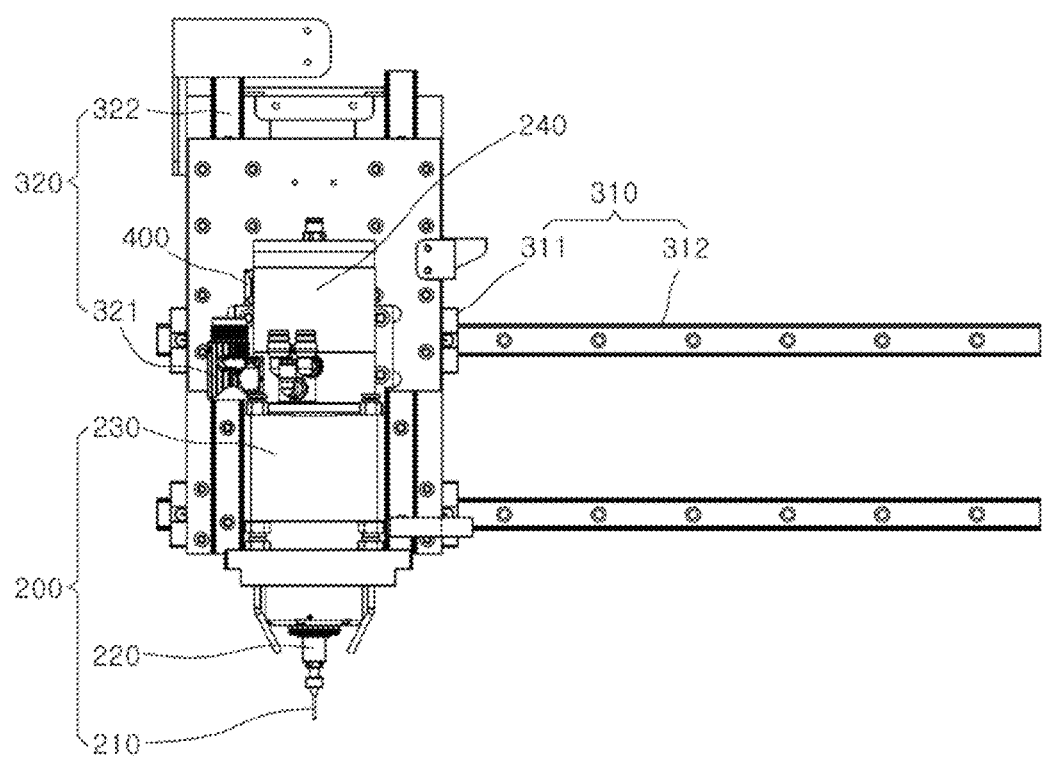
FIG. 3 is a view illustrating a state in which a spindle monitoring portion is coupled to a processing tool portion and a linear motor portion in the real-time monitoring system for the artificial tooth processing machine according to one embodiment of the present invention.
Figure 4:
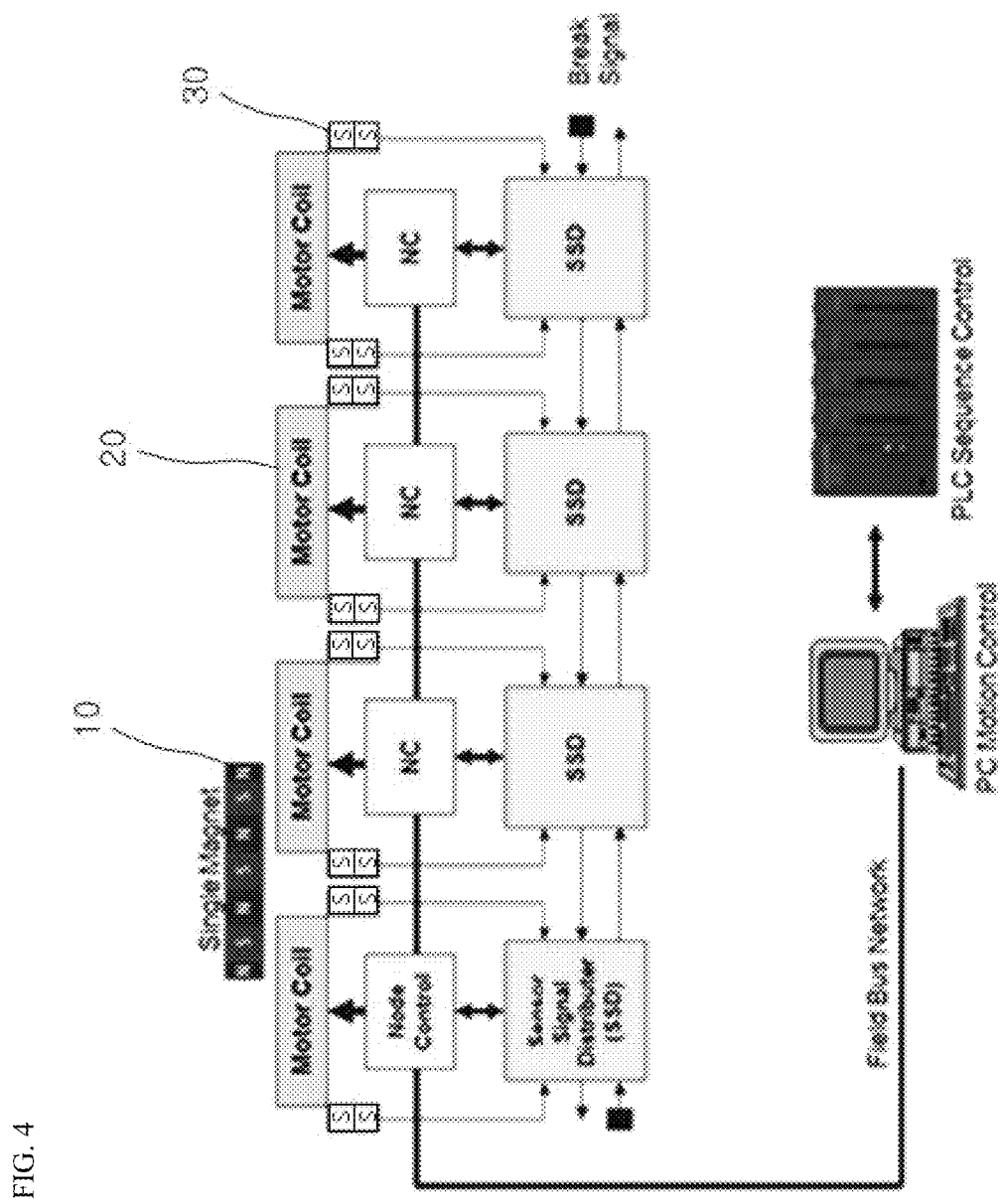
FIG. 4 is a schematic diagram illustrating basic components of the linear motor portion of the real-time monitoring system for the artificial tooth processing machine according to one embodiment of the present invention.
Figure 5:
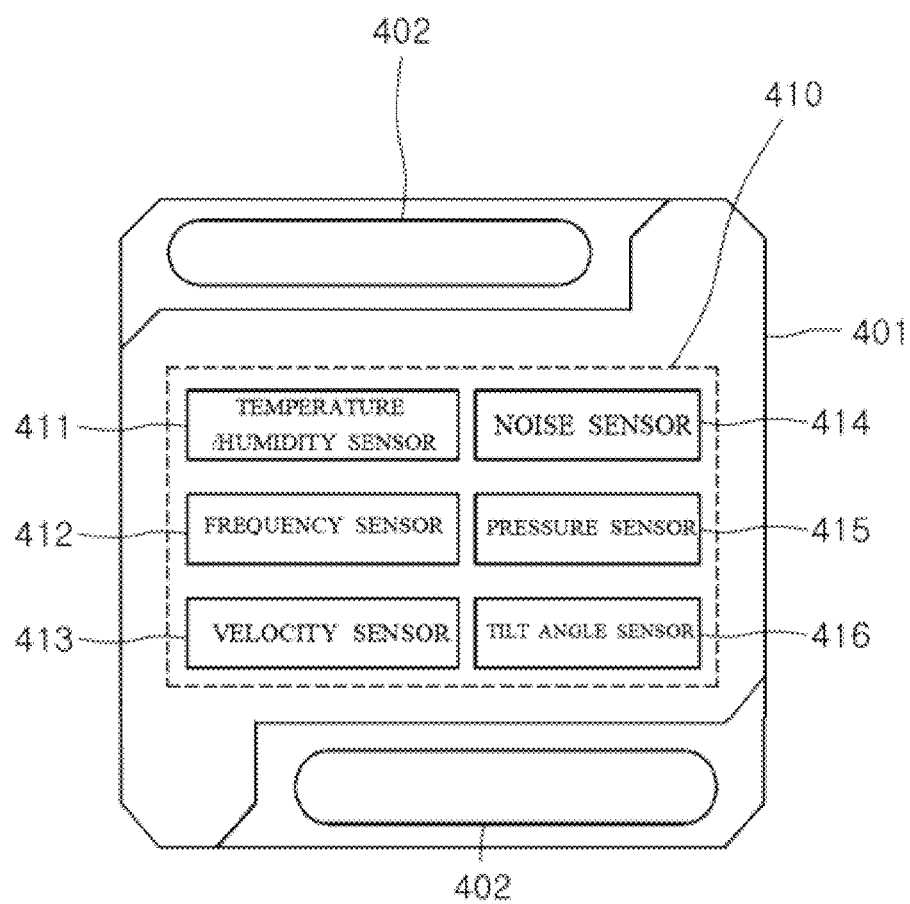
FIG. 5 is a front view illustrating a predictive diagnosis sensor portion in the real-time monitoring system for the artificial tooth processing machine according to one embodiment of the present invention.
Figure 6:
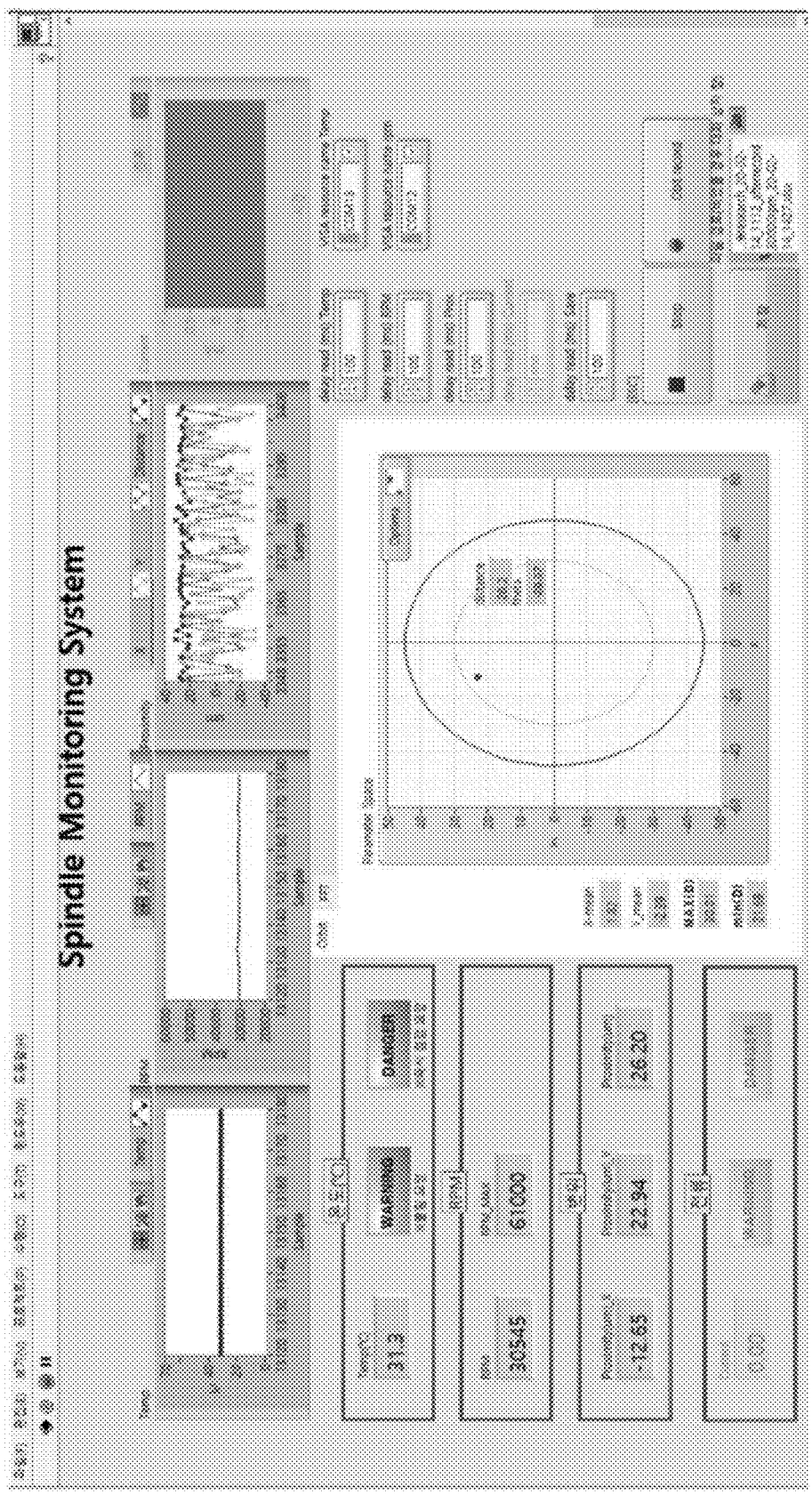
FIG. 6 is a view illustrating an example of a configuration for sensing a temperature, revolutions per minute (RPM), and displacement using the spindle monitoring portion of the real-time monitoring system for the artificial tooth processing machine according to one embodiment of the present invention.

FIG. 1 is a configuration diagram of a real-time monitoring system for an artificial tooth processing machine according to one embodiment of the present invention, FIG. 2 is a perspective view illustrating a state in which a casing of the artificial tooth processing machine is eliminated from the real-time monitoring system for the artificial tooth processing machine according to one embodiment of the present invention, FIG. 3 is a view illustrating a state in which a spindle monitoring portion is coupled to a processing tool portion and a linear motor portion in the real-time monitoring system for the artificial tooth processing machine according to one embodiment of the present invention, FIG. 4 is a schematic diagram illustrating basic components of the linear motor portion of the real-time monitoring system for the artificial tooth processing machine according to one embodiment of the present invention, FIG. 5 is a front view illustrating a predictive diagnosis sensor portion in the real-time monitoring system for the artificial tooth processing machine according to one embodiment of the present invention, and FIG. 6 is a view illustrating an example of a configuration for sensing a temperature, revolutions per minute (RPM), and displacement using the spindle monitoring portion of the real-time monitoring system of the artificial tooth processing machine according to one embodiment of the present invention.

As shown in FIGS. 1 to 6, a real-time monitoring system of an artificial tooth processing machine according to the present invention may include a work bed portion 100 on which a base tooth material selected from a titanium material and a zirconia material is fixedly installed and in which a wet die 120 configured to process a titanium material and a dry die 110 configured to process a zirconia material are disposed to be comparted from each other, a processing tool portion 200 having one end on which a driving spindle 220 to which a processing tool 210 is coupled is provided to approach or move away from the base tooth material, and a spindle monitoring portion provided on the driving spindle, disposed in the work bed portion, and configured to monitor the driving spindle to recognize an abrasion degree, a damage state, or alignment of the processing tool 210 in real time.

Generally, as shown in FIGS. 1 to 2, the work bed portion 100 may be provided to be divided into the wet die 120 on a left side and the dry die 110 on a right side. A central partition 130 may be disposed between the wet die 120 and the dry die 110, and a through hole (not shown) configured to allow the processing tool portion 200 to be transferred without interference may be provided in the central partition 130.

On the wet die 120, a wet jig 121 and a pickup station 122 may be provided and a titanium material to be cut with a cutting oil may be processed. Here, the titanium material may be processed as a base tooth material of an abutment to be coupled to a bottom of an artificial tooth.

Also, the dry die 110 is provided on the right side on the basis of FIG. 2. Here, a first dry jig 111 and a second dry jig 112 that can pivot perpendicularly thereto may be provided on the dry die 110. The first dry jig 111 and the second dry jig 112 may interact with each other to process an artificial tooth, and an additional fixing assembly (not shown) configured to fix the base tooth material may be coupled to the first dry jig 111. Generally, on the dry die 110, a zirconia material that is a material for an artificial tooth may be processed.

A dust-collecting portion 140 may be provided below the dry die 110 to collect and discharge dust and chips.

In more detail with respect to the work bed portion 100, since it is necessary to change processing conditions according to a material and a degree of difficulty in cutting, different materials may be processed at the same time, such as a titanium material being processed on the dry die and a zirconia material being processed on the wet die.

Since a variety of materials are processed at the same time as described above, the processing machine may process continuously rather than intermittently, and productivity may be improved by eliminating an additional process and performing processing in a single process.

Generally, as shown in FIGS. 1 and 2, the processing tool portion 200 may have a fore end on which the processing tool 210 is mounted, and the processing tool 210 may be coupled to the driving spindle 220. The driving spindle 220 may be rotatably coupled by a driving motor 240 supported by a spindle bracket 230.

The processing tool portion 200 may be coupled by the linear motor portion 300 to be axially transferable. The linear motor portion 300, referring to FIG. 3, may include an X-axis transfer portion 310 and a Z-axis transfer portion 320.

The X-axis transfer portion 310 may include an X-axis linear motor 311 and an X-axis transfer rail 312, and the Z-axis transfer portion 320 may include a Z-axis linear motor 321, a Z-axis transfer rail 322, and a motor drive 500.

Here, referring to FIG. 5, the X-axis linear motor 311 and the Z-axis linear motor 321 may be formed as moving-magnet linear motors.

In more detail, the X-axis linear motor 311 and the Z-axis linear motor 321 may each include a motor portion including a stator 20 of a motor coil and an operator 10 formed of a permanent magnet plate and a sensor portion including two Hall sensors 30 for detecting an approach of the operator and for measuring the velocity and position of the operator.

The stator 20 of the motor portion may include a plurality of coils in a row in a direction in which the operator 10 moves.

Also, the sensor portion may include the two Hall sensors 30 on both ends of a coil. Also, the Hall sensors 30 may be arranged to be vertically stacked. The two Hall sensors are arranged at 90° (as a sensor module) to generate sine waves, and a rising edge signal and a falling edge signal of each of the Hall sensors 30 are set to be a velocity measurement cycle to calculate a velocity of the operator 10. The position of the operator 10 may be measured by integrating the calculated velocity.

Using the linear motor portion 300 configured as described above, the processing tool 210 is driven and operated using the linear motor instead of a conventional rotational type driving actuator so that high precision may be provided and vibration may be suppressed during a processing process.

Meanwhile, in the case of a conventional processing machine, since an abrasion degree, a damage state, or alignment of the processing tool 210 is recognized with the naked eye and the processing tool 210 is replaced or a balancing operation is performed depending on a skill level of a worker, there is a problem that maintenance and repair costs and the number of operations necessarily increase.

Accordingly, in the embodiment, the spindle monitoring portion 400 may be provided. Generally, as shown in FIG. 1, the spindle monitoring portion 400 may be connected to an output device. The spindle monitoring portion 400 may be a predictive diagnosis sensor portion 410 attached to the driving spindle 220.

Generally, as shown in FIG. 5, the predictive diagnosis sensor portion 410 may include a velocity sensor 413 configured to measure a velocity and acceleration, a pressure sensor 415 configured to measure a pressure, a temperature/humidity sensor 411 configured to measure a temperature/humidity of the work bed portion 100, a tilt angle sensor 416 configured to measure a tilt and a frequency sensor 412 configured to sense RPM and a vibrational degree of the driving spindle 220 from a measured frequency measured by the processing tool portion 200.

Also, the predictive diagnosis sensor portion 410 may further include an impact sensor (not shown) configured to sense an impact transferred to the driving spindle 220 and a noise sensor 414 configured to sense noise from a nature frequency.

Generally, as shown in FIG. 5, the predictive diagnosis sensor portion 410 may be packaged in a single body 401, and long coupling holes 402 may be provided in both ends of the single body 401. The predictive diagnosis sensor portion 410 may be detachable from the driving spindle 220 using the long coupling holes 402.

As shown in FIG. 6, the velocity sensor 413 may show micro displacement motion of the driving spindle 220.

The pressure sensor 415 may monitor the intensity of an external force and the like applied to the driving spindle 220.

The temperature/humidity sensor 411 may allow determination of whether a corresponding process is a dry process or a wet process to set RPM and the like (first and second thresholds and the like) of the driving spindle 220 corresponding to the corresponding process.

The frequency sensor performs a function of sensing RPM and a vibrational degree of the driving spindle 220 from a measured frequency measured by the processing tool portion 200.

Here, a parameter value of the measured frequency may be any one of a root-mean-square (RMS) value, a peak value, and fast Fourier transform (FFT) value.

The frequency sensor 412 may output a warning notification signal when a parameter value of a sensed measured frequency exceeds a preset first threshold.

Also, the frequency sensor 412 may output an operation stop signal to the processing tool portion 200 when a parameter value of a sensed measured frequency exceeds a preset second threshold.

Accordingly, since it is possible to quickly and easily recognize an abrasion degree, a damage state, alignment, or the like of the processing tool 210, a predictive diagnosis of a replacement time, rebalancing, or the like is possible so that maintenance and repair costs and the number of operations can be reduced and productivity of processing an artificial tooth can be improved. Also, since it is possible to recognize a state of a tool in real time according to a dry or wet environment, a coarse value of an artificial tooth and the density of artificial tissue are processed to desired levels to significantly increase the rigidity or life of the artificial tooth.

Figure 7:
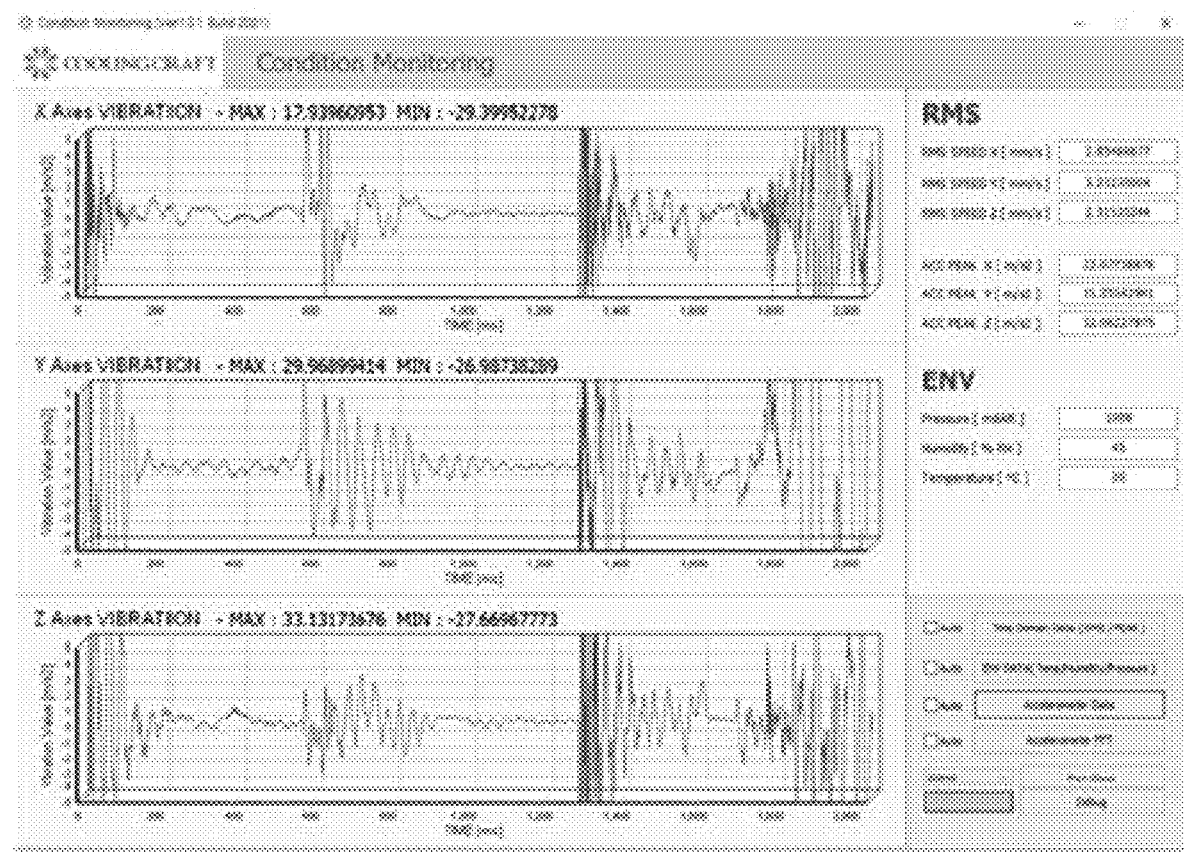
FIG. 7 is a view illustrating a monitoring screen with respect to a vibrational degree of the real-time monitoring system for the artificial tooth processing machine according to one embodiment of the present invention.
Figure 7:
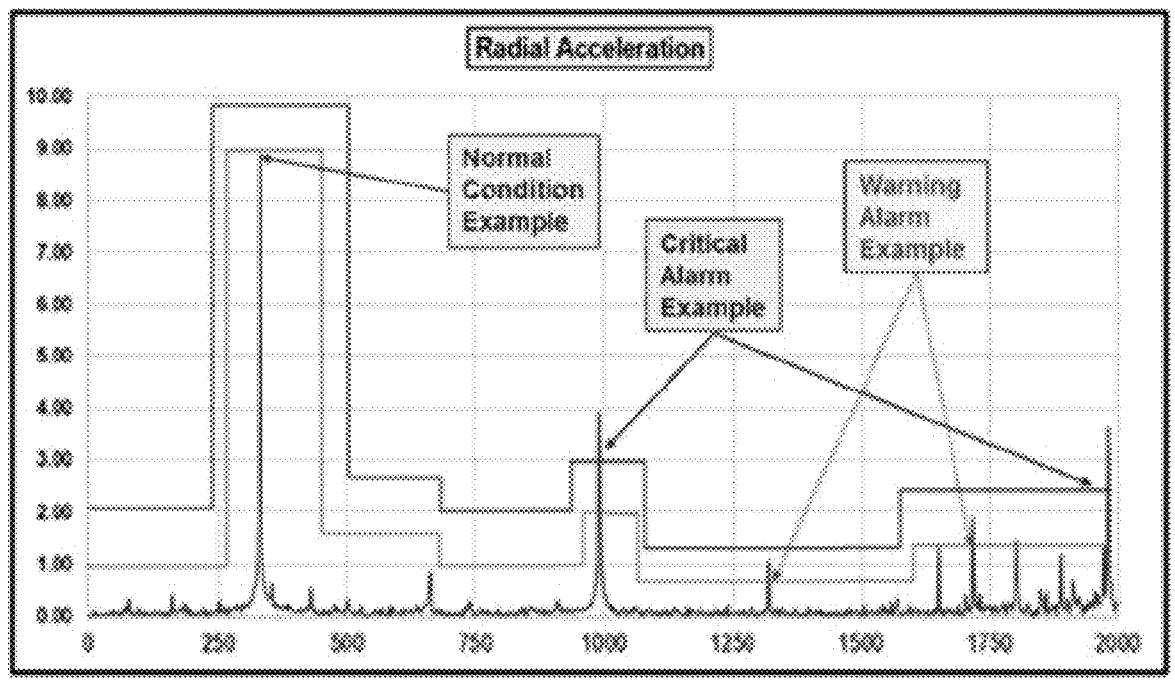
Figure 8:
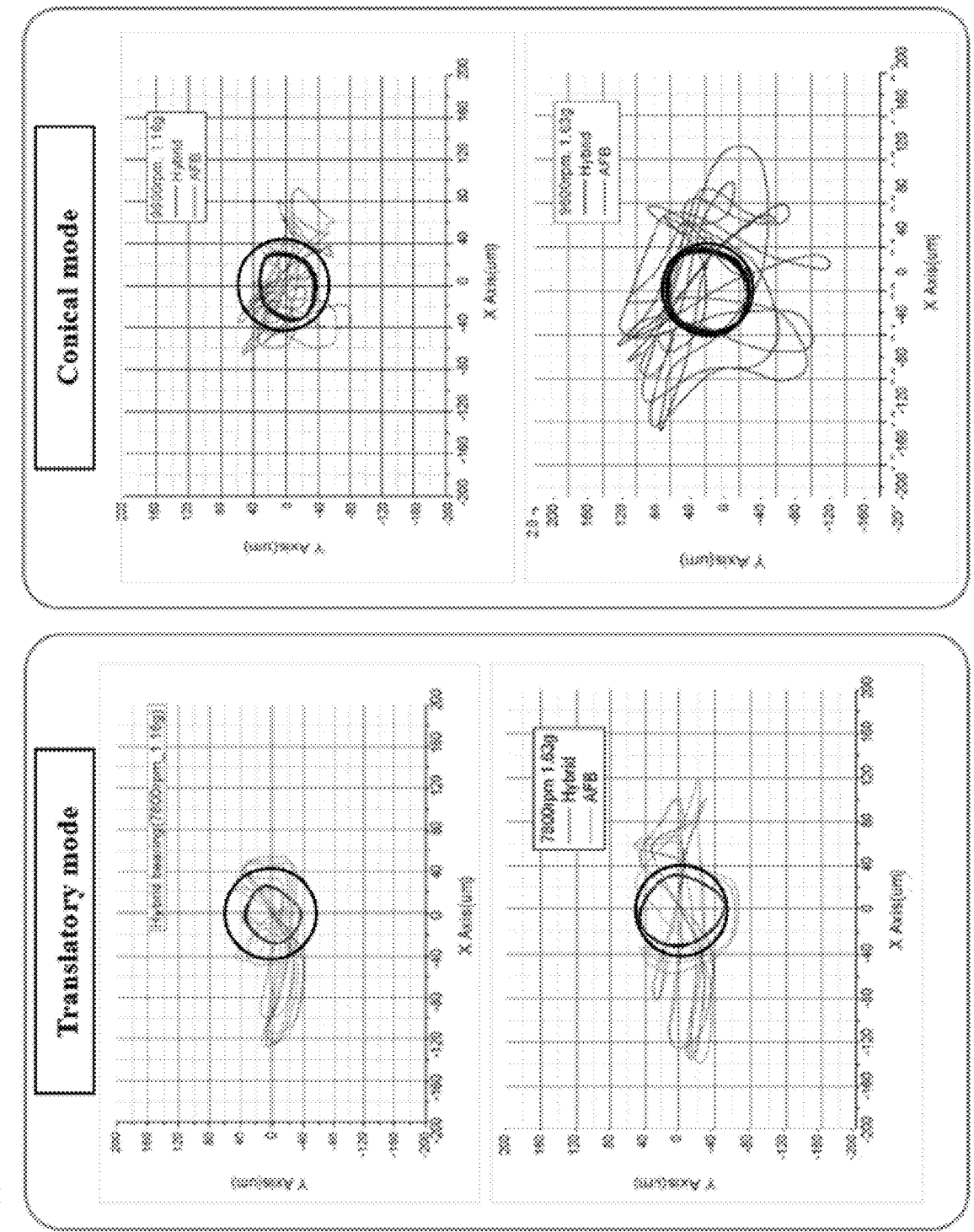
FIG. 8 is a view illustrating a result of measuring translation and rotation of the spindle monitoring portion of the real-time monitoring system for the artificial tooth processing machine according to one embodiment of the present invention.

FIG. 7 is a view illustrating a monitoring screen with respect to a vibrational degree of the real-time monitoring system of the artificial tooth processing machine according to one embodiment of the present invention, and FIG. 8 is a view illustrating a result of measuring translation and rotation of the spindle monitoring portion of the real-time monitoring system of the artificial tooth processing machine according to one embodiment of the present invention.

Referring to FIG. 6, the frequency sensor 412 may sense vibration information of an X-axis, a Y-axis, and a Z-axis according to time. Using the frequency sensor 412, an RMS value of a measured frequency of the driving spindle 220 may be measured by measuring a nature frequency of the processing tool portion 200. Also, it may be monitored using a peak value of the measured frequency whether the driving spindle 220 is at a dangerous level (warning notification) or has reached its replacement time.

Also, an FFT value of the measured frequency may be used. As shown in FIG. 7, the FFT value may be obtained by performing an FFT on the measured frequency and monitored. When the FFT value reaches the first threshold preset for each particular band, a warning notification signal may be output. Otherwise, when the FFT value exceeds the second threshold, the operation stop signal may be output for a forced stop.

Also, an error may be diagnosed depending on whether the peak value of the measured frequency at particular RPM exceeds the preset threshold.

That is, a dry process or a wet process is determined using the temperature/humidity sensor 411 and a guide line with respect to RPM according to the corresponding process and an FFT value corresponding thereto is determined. When the FFT value deviates from the first threshold, a warning notification signal may be output. When the second threshold is exceeded, an operation stop signal may be output.

For example, as shown in FIG. 6, a stage before a warning notification may be near 300 RPM, and an operation stop signal may be output near 1,000 RPM or 2,000 RPM.

Also, in a situation corresponding to a wet process with a condition in which driving RPM of the driving spindle 220 is 60,000 RPM and operation RPM is 40,000 RPM, when a measured RPM is lower than a preset RPM value, an operation stop signal may be output on its own.

Referring to FIG. 8, a result of monitoring displacement of translation and rotation of the driving spindle 220 is shown. A first or second threshold may be set to monitor whether the displacement is within or exceeds a range thereof.

Meanwhile, a monitoring program may be connected using an additional gateway (not shown) configured to perform transmission and reception in the predictive diagnosis sensor portion 410. Using the monitoring program, an error may be diagnosed from the sensed measured frequency and then a replacement time of the processing tool 210, rebalancing of the driving spindle 220, or the like may be predictively diagnosed and maintained.

Since it is possible to quickly and easily recognize an abrasion degree, a damage state, alignment, or the like of the processing tool 210 through the above components and stages, a predictive diagnosis of a replacement time, rebalancing, or the like is possible so that maintenance and repair costs and the number of operations can be reduced and productivity of processing an artificial tooth can be improved. Also, since it is possible to recognize a state of a tool in real time according to a dry or wet environment, a coarse value of an artificial tooth and the density of artificial tissue are processed to desired levels to significantly increase the rigidity or life of the artificial tooth.

Also, since the processing tool 210 is driven using the linear motor instead of a conventional rotational type driving actuator, higher precision may be provided and vibration may be suppressed during processing.

Although an exemplary embodiment of the present invention has been described above in detail, the scope of the present invention is not limited to the particular embodiment and should be defined by the attached claims. Also, it should be noted that a variety of corrections and modifications may be made by one of ordinary skill in the art without departing from the scope of the present invention.

What is claimed is:

1. A real-time monitoring system for an artificial tooth processing machine, the real-time monitoring system comprising:
   a work bed portion on which a base tooth material selected from a titanium material and a zirconia material is fixedly installed and in which a wet die configured to process the titanium material and a dry die configured to process the zirconia material are disposed to be comparted from each other;
   a processing tool portion having one end on which a driving spindle to which a processing tool is coupled is provided to process the base tooth material while approaching or moving away from the base tooth material; and
   a spindle monitoring portion provided on the driving spindle, disposed in the work bed portion, and configured to monitor the driving spindle to recognize an abrasion degree, a damage state, and alignment of the processing tool in real time,
   wherein the spindle monitoring portion is a predictive diagnosis sensor portion attached to the driving spindle, and
   the predictive diagnosis sensor portion comprises:
   a velocity sensor configured to measure a velocity and acceleration;
   a pressure sensor configured to measure a pressure;
   a temperature/humidity sensor configured to sense a temperature/humidity of the work bed portion;
   a tilt angle sensor configured to measure a tilt; and
   a frequency sensor configured to sense revolutions per minute (RPM) and a vibrational degree of the driving spindle from a measured frequency measured by the processing tool portion.

2. The real-time monitoring system of claim 1, wherein the predictive diagnosis sensor portion is packaged in a single body, and
   wherein long coupling holes are formed in both ends of the single body.

3. The real-time monitoring system of claim 1, wherein the predictive diagnosis sensor portion further comprises:
   a noise sensor configured to sense noise from a nature frequency.

4. The real-time monitoring system of claim 1, wherein a parameter value of the measured frequency is any one of a root-mean-square (RMS) value, a peak value, and fast Fourier transform (FFT) value.

5. The real-time monitoring system of claim 4, wherein the frequency sensor outputs a warning notification when the parameter value of the sensed measured frequency exceeds a preset first threshold.

6. The real-time monitoring system of claim 5, wherein the frequency sensor allows an operation of the processing tool portion to be stopped when the parameter value of the sensed measured frequency exceeds a preset second threshold.

* * * * *